United States Patent [19]

Soules et al.

[11] Patent Number: 5,680,005
[45] Date of Patent: Oct. 21, 1997

[54] PHOSPHOR DISTRIBUTION FOR HELICAL COMPACT FLUORESCENT LAMP

[75] Inventors: Thomas F. Soules, Richmond Heights; Pamela K. Whitman, Mayfield Village; Jennifer L. Barry, Bay Village, all of Ohio

[73] Assignee: General Electric Company, Schenectady, N.Y.

[21] Appl. No.: 414,320

[22] Filed: Mar. 31, 1995

[51] Int. Cl.$^6$ .................................................. H01J 1/62
[52] U.S. Cl. .......................... 313/493; 313/485; 313/573; 313/635
[58] Field of Search ........................... 313/485, 493, 313/573, 634, 635

[56] References Cited

U.S. PATENT DOCUMENTS

| | | | |
|---|---|---|---|
| 2,788,462 | 6/1954 | MacFarlane | 313/634 |
| 3,764,844 | 10/1973 | Schmidt | 313/634 |
| 3,886,396 | 5/1975 | Hammer et al. | 313/486 |
| 3,898,495 | 8/1975 | Livera | 313/51 |
| 3,953,761 | 4/1976 | Giudice | 315/71 |
| 4,503,360 | 3/1985 | Bedel | 313/493 |
| 4,694,215 | 9/1987 | Hofmann | 313/44 |
| 4,797,594 | 1/1989 | Sigai et al. | 313/488 |
| 5,128,590 | 7/1992 | Holzer | 315/58 |
| 5,150,965 | 9/1992 | Fox | 313/493 |
| 5,220,236 | 6/1993 | Washburn et al. | 313/493 |
| 5,331,168 | 7/1994 | Beaubien et al. | 250/372 |
| 5,341,068 | 8/1994 | Nerone | 315/219 |
| 5,361,017 | 11/1994 | Krause | 315/151 |

FOREIGN PATENT DOCUMENTS

| | | |
|---|---|---|
| 4133077A1 | 4/1993 | Germany . |
| WO9429895 | 12/1994 | WIPO . |

*Primary Examiner*—Sandra L. O'Shea
*Assistant Examiner*—J. M. Patidar
*Attorney, Agent, or Firm*—George E. Hawranko

[57] ABSTRACT

A compact fluorescent lamp is provided in a coiled or helical configuration in order to maximize the length of discharge tubing for a given height. A non-uniform coating of phosphor is provided on the interior surface of the discharge envelope to inhibit light otherwise directed inwardly into the lamp toward a longitudinal axis of the helical configuration and redirect the light outwardly through an outer circumferential portion having a thinner phosphor coating. This results in increased light output for an given lamp geometry and lamp power.

6 Claims, 1 Drawing Sheet

PHOSPHOR DISTRIBUTION FOR HELICAL COMPACT FLUORESCENT LAMP

BACKGROUND OF THE INVENTION

This invention pertains to the art of discharge lamps and more particularly to low pressure discharge lamps. It is particularly applicable to a compact fluorescent lamp having a coiled configuration, preferably in the shape of a double helix, and will be described with reference thereto. However, it will be appreciated that the invention has broader applications and may be advantageously employed in related environments and applications.

In recent years, there has been a tremendous surge in the use of compact fluorescent lamps in place of conventional incandescent lamps. Consumers and commercial establishments are converting to compact fluorescent lamps because of the longer life and improved energy efficiency of the compact fluorescent lamp over that of the conventional incandescent lamp. One example of a compact fluorescent lamp is shown and described in U.S. Pat. No. 4,503,360 issued to D. E. Bedel on Mar. 5, 1985.

Commercially available compact fluorescent lamps use a plurality of parallel tube portions that extend outwardly from a base for a predetermined length. The tubes are interconnected at bridge portions and an arc weaves between the electrodes, up and down the tubes, and around the carousel of bent tubes.

Still another manufacturer provides a coiled double helix configuration for the discharge envelope. The helical configuration provides a more compact arrangement for any given length and diameter of narrow tubing. For example, known coiled configurations are shown and described in German Application No. DE 4133077, filed Oct. 2, 1991 and assigned to Narva Berliner Gluhlampenwerk GmbH, and in published PCT Application WO 9429895, assigned to Lee O. Y.

In order to compare favorably to incandescent lamps, higher lumen output levels must be achieved in compact fluorescent lamps. For instance, it is desirable to provide a compact fluorescent lamp that achieves substantially the same lumen output as a one hundred (100) watt incandescent lamp. A compact fluorescent lamp of sufficiently high power to give the lumen output of a 100 watt or higher incandescent lamp, while operating at currents low enough to be very efficient, requires a relatively long arc length of greater than approximately sixty (60) centimeters (cm). The overall effect of using a coiled configuration for the lamp envelope is to achieve greater efficiency as compared to a compact fluorescent lamp that uses a U-shaped envelope.

One of the detrimental effects of trying to incorporate an extended envelope length in a compact structure is that some of the light generated from the discharge tube is directed inwardly into the lamp. Some of this radiated light is lost as it strikes and passes through other tube segments. Typically, around forty percent (40%) of the light generated by a compact fluorescent lamp radiates inward and about ten to seventeen percent (10%–17%) of that light is lost due to absorption in the glass, phosphor coating, or lamp housing. Therefore, lamp geometries and coating distributions which decrease the amount of light that enters the interior portion of the lamp can potentially produce more useful lumens for the same lamp power, i.e., higher system efficacy.

Generally, there is a broad range of coating weight densities which provide near maximum light output for the lamp. There is a trade-off, however, between providing too thick of a coating of phosphor versus decreasing the thickness. At decreased coating weights, the light output of the lamp increases with increasing coating thickness as more UV radiation is absorbed. For a density ranging between three (3 mg/cm$^2$) and six milligrams per centimeter squared (6 mg/cm$^2$), or more precisely between about 3 and 7 particle layers thick, there is only a small further increase in the amount of ultraviolet (UV) radiation absorbed. This is offset, though, by an increase in the amount of visible light generated inside of the lamp which is then lost as it tries to pass through the coating. Hence, over this range the light output of a typical linear lamp is more or less constant. At coating weights higher than this preferred range, light output decreases with increasing coating thickness since substantially all of the UV radiation is absorbed by the coating and more light is lost due to visible absorption as the light tries to exit the envelope.

For most conventional fluorescent lamps, a uniform distribution of coating thickness provides optimum light output. In some cases, however, a non-uniform coating thickness can improve light output. Commercially available helically configured compact fluorescent lamps, however, have not heretofore incorporated those features into their designs.

SUMMARY OF THE INVENTION

The present invention provides a low pressure discharge lamp in which the envelope that contains a gas fill is coiled into a helical configuration. A phosphor coating provided on the interior surface of the envelope is non-uniformly distributed to maximize the light output from the lamp.

According to another aspect of the invention, the phosphor coating disposed along an inner circumference of the helical configuration of the discharge envelope has a greater thickness than the phosphor coating along an outer circumference.

According to a preferred method of forming a low pressure discharge lamp, a substantially uniform coating of phosphor is applied to the interior surface of the tubular envelope. Thereafter, the envelope is coiled about a longitudinal axis into a helical configuration thereby providing an uneven distribution. The phosphor coating along the inner circumference of the envelope is compressed and more dense while the coating along an outer circumference is stretched and less dense than the thickness of the original uniform coating.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings. The drawings include.

DETAILED DESCRIPTION OF THE PREFERRED EMBODIMENT

Figure 1:
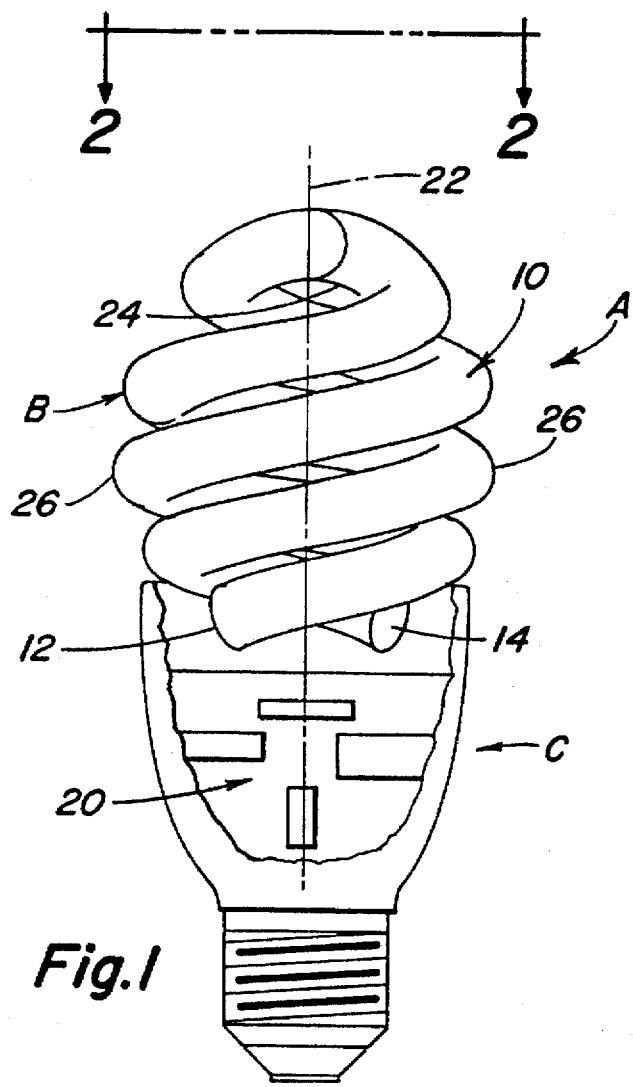
FIG. 1, which is an elevational view of a preferred compact fluorescent light having a double helical configuration formed in accordance with the subject invention.

Referring now to the drawings wherein the showings are for the purposes of illustrating the preferred embodiment of the invention only and not for purposes of limiting same, the FIGURES show a low pressure discharge lamp assembly A, particularly, a compact fluorescent lamp assembly having an envelope B and a base or housing C.

Figure 2:
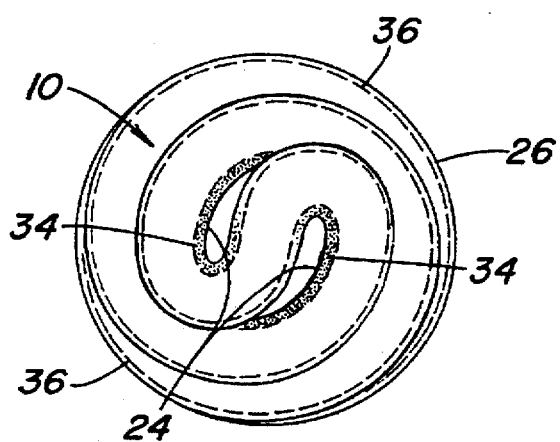
FIG. 2, which is a top plan view taken generally along the lines 2–2 of FIG. 1.

More particularly, and turning initially to FIGS. 1 and 2, a compact fluorescent lamp assembly having an integral ballast or drive circuit assembly provided in the housing is shown. The envelope B is preferably an elongated tube 10 having first and second ends 12, 14 that are received in the housing. The envelope is sealed from the external environment and contains a fill gas, typically mercury and a noble gas such as argon, which is selectively energized to a discharge state. Ballast assembly 20 received in the housing provides regulated power through a pair of lamp leads (not shown) to electrodes that are disposed within and adjacent the first and second ends of the tube. An arc develops through the internal cavity of the envelope and electrons emitted by the electrodes provide kinetic energy to the atoms of the fill gas which, when relaxed to a lower energy state, dissipate radiation. General details of the structure and operation of a compact fluorescent lamp are well known in the art so that more particular details are omitted for purposes of brevity.

According to the present invention, the thickness of a phosphor coating provided on an interior wall of the discharge envelope is controlled so that light, that would otherwise be directed inwardly and some lost toward a central or longitudinal axis 22 of the helical configuration, is directed outwardly to an outer circumference of the assembly. As shown in an exaggerated form in FIG. 2, an inner circumferential region of the envelope is denoted by numeral 24. Those inner circumferential portions of the envelope in the double helix configuration face inwardly toward the longitudinal axis 22.

Also delineated in FIG. 2 by dashed lines is an outer circumferential region 26. It will be recognized that the outer circumferential region is generally defined by that surface of the envelope that faces outwardly from the longitudinal axis 22.

Figure 3:
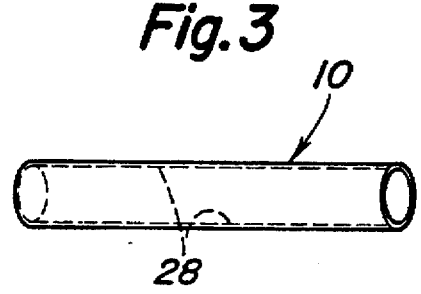
FIG. 3, which is an elevational view of a portion of the envelope having a phosphor coating prior to coiling.
Figure 4:
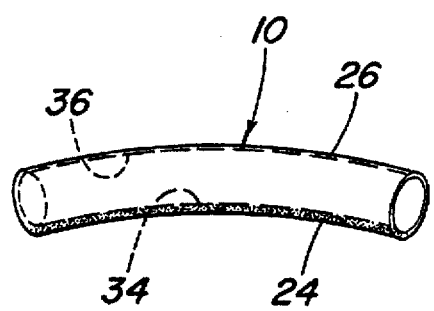
FIG. 4, which is an elevational view of the envelope portion of FIG. 3 after the coiling operation.

Described in another way, and as best illustrated in FIGS. 3 and 4, the discharge envelope or tube 10 is originally formed as an elongated cylindrical or tubular structure, a portion of which is represented in FIG. 3. A coating of phosphor 28 is uniformly applied to the interior surface of the envelope. This uniform coating can be obtained by applying rare-earth phosphor powders in a suspension form or as a dry powder using appropriate dispersants and adhesion additives. Details of these conventional methods and process for applying the phosphor coating are well known in the art and need not be described herein for a full and complete understanding of the present invention.

As shown in FIG. 4, the coiling operation results in one portion of the tube being placed under tensile forces (the outer circumferential portion 26) and a diametrically opposite portion being placed under compressive forces (the inner circumferential portion 24). The coating which was previously uniformly distributed along the interior surface, also undergoes these compressive and tensile forces. This results in a portion 34 (denoted by dashed lines) of the coating defined on what eventually becomes the inner circumferential region 24 being placed under compressive forces. The portion 34 of the phosphor coating has an increased density distribution or thicker coating of phosphor relative to the original thickness of the uniformly applied coating. Likewise, the tensile forces imposed on the outer circumferential region 26 result in a stretched or thinner portion 36 of phosphor coating.

Rather than coating the discharge envelope with phosphor after the coiling operation, the coiling operation can be used to automatically and advantageously distribute the originally uniform phosphor coating into a non-uniform relationship to serve the various purposes desired for increased lamp efficacy. The increased phosphor distribution on the inner circumferential portion prevents some of the light from radiating on the inside of the tubing radially inward toward the longitudinal axis and reflects it radially outward. Likewise, more light from the inner surface can ultimately escape through the thinner coating on the outer circumferential portion with less visible light being absorbed.

Coiling a glass tube having a diameter of approximately twelve millimeters (12 mm) into a helical configuration with an outer diameter of approximately sixty four millimeters (64 mm) causes the length of the discharge tubing to be compressed to approximately eighty five percent (85%) of its original length along the inner circumferential region. On the other hand, the outer circumferential region of the tubing is stretched to approximately one-hundred thirty percent (130%) of its initial value. For example, the tubing that is originally coated with an average coating density of 3.2 milligrams per centimeter squared (3.2 mg/cm$^2$) results in a density distribution of phosphor on the order of 1.8 mg/cm$^2$ to 3.2 mg/cm$^2$ (2.0 to 3.5 layers thick) or, more specifically, of approximately 2.5 milligrams per centimeter squared (2.5 mg/cm$^2$) on the outer circumferential region and on the order of 3 mg/cm$^2$ to 7 mg/cm$^2$ (4 to 5 layers thick) or, more specifically, 3.8 milligrams per centimeter squared (3.8 mg/cm$^2$) on the inner circumferential region. This provides a one to two percent (1%–2%) improvement in total light output of the lamp when compared to a lamp having a uniform distribution of phosphor.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What we claim as new and desire to secure by Letters Patent of the United States is:

1. A low pressure discharge lamp comprising:

an envelope containing a gas fill that is energizable to a discharge state, the envelope having a coiled configuration wound about a longitudinal axis and a phosphor coating along an interior surface of the envelope for converting rediation from the discharge state of the gas fill into visible light, the phosphor coating being unevenly distributed along the interior surface of the envelope to maximize the light output from the lamp, wherein the phosphor coating on a first portion of the interior surface of the envelope disposed along an inner circumference of the coiled configuration adjacent the longitudinal axis has a greater thickness than the phosphor coating on a second portion of the envelope disposed along an outer circumference of the coiled configuration wherein the phosphor coating on the first portion has a density distribution on the order of 3 mg/cm$^2$ to 7 mg/cm$^2$.

2. The low pressure discharge lamp as defined in claim 1 wherein the phosphor coating on the second portion has a density distribution on the order of 1.8 mg/cm$^2$ to 3.2 mg/cm$^2$.

3. A low pressure discharge lamp comprising:

an envelope containing a gas fill that is energizable to a discharge state, the envelope having a coiled configuration wound about a longitudinal axis and a phosphor coating along an interior surface of the envelope for converting rediation from the discharge state of the gas fill into visible light, the phosphor coating being unevenly distributed along the interior surface of the envelope to maximize the light output from the lamp, wherein the phosphor coating on a first portion of the interior surface of the envelope disposed along an inner circumference of the coiled configuration adjacent the longitudinal axis has a greater thickness than the phosphor coating on a second portion of the envelope disposed along an outer circumference of the coiled configuration wherein the phosphor coating on the second portion has a density distribution on the order of 1.8 mg/cm$^2$ to 3.2 mg/cm$^2$.

4. A low pressure discharge lamp comprising:

an envelope containing a gas fill that is energizable to a discharge state, the envelope having a coiled configuration wound about a longitudinal axis and a phosphor coating along an interior surface of the envelope for converting rediation from the discharge state of the gas fill into visible light, the phosphor coating being unevenly distributed along the interior surface of the envelope to maximize the light output from the lamp, wherein the phosphor coating on a first portion of the interior surface of the envelope disposed along an inner circumference of the coiled configuration adjacent the longitudinal axis has a greater thickness than the phosphor coating on a second portion of the envelope disposed along an outer circumference of the coiled configuration wherein the phosphor coating on the first portion is approximately 4 to 5 layers thick.

5. The low pressure discharge lamp as defined in claim 4 wherein the phosphor coating on the second portion is approximately 2.0 to 3.5 layers thick.

6. A low pressure discharge lamp comprising:

an envelope containing a gas fill that is energizable to a discharge state, the envelope having a coiled configuration wound about a longitudinal axis and a phosphor coating along an interior surface of the envelope for converting rediation from the discharge state of the gas fill into visible light, the phosphor coating being unevenly distributed along the interior surface of the envelope to maximize the light output from the lamp, wherein the phosphor coating on a first portion of the interior surface of the envelope disposed along an inner circumference of the coiled configuration adjacent the longitudinal axis has a greater thickness than the phosphor coating on a second portion of the envelope disposed along an outer circumference of the coiled configuration wherein the phosphor coating on the second portion is approximately 2.0 to 3.5 layers thick.

\* \* \* \* \*